UNITED STATES PATENT OFFICE.

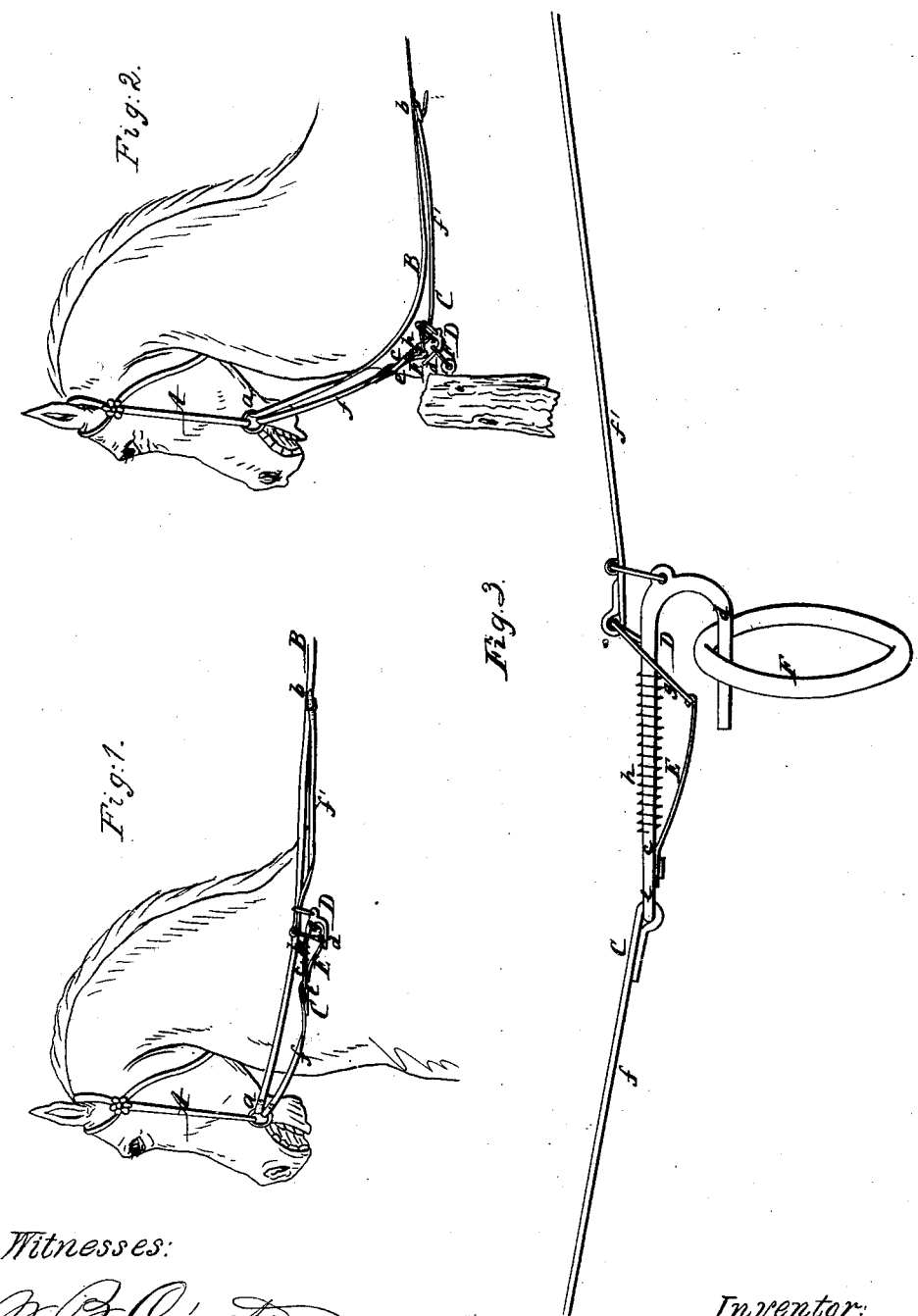

B. B. LEWIS, OF NEW YORK, N. Y.

IMPROVED SNAP-HOOK.

Specification forming part of Letters Patent No. 57,156, dated August 14, 1866.

*To all whom it may concern:*

Be it known that I, B. B. LEWIS, of the city, county, and State of New York, have invented a new and Improved Snap-Hook for Hitching-Straps; and I do hereby declare that the following is a full, clear, and exact description thereof, which will enable others skilled in the art to make and use the same, reference being had to the accompanying drawings, forming part of this specification, in which—

Figure 1 is a view of my invention applied to a bridle on a horse, the parts being in the position they occupy when the horse is not hitched, or is not tied to a post, or is being driven. Fig. 2 is the same view, showing the horse hitched or attached to a post; Fig. 3, an enlarged detached view of the invention.

Similar letters of reference indicate like parts.

The object of this invention is to obtain a snap-hook for hitching-straps which will admit of being disengaged from a post or ring by simply pulling the reins or lines by which the horse is driven, and thereby obviate the necessity of a person detaching the hook from the ring previous to getting into a vehicle or mounting a horse.

A represents an ordinary riding or harness bridle, and B the reins or lines thereof.

C is a hitching-strap, one end of which is secured in one of the bit-rings $a$, and the opposite end attached to one of the reins or lines B, as shown at $b$. The hitching-strap is allowed to be rather loose or slack when the reins or lines are drawn taut.

D represents my improved snap-hook, composed of a bar or shank, one part, $c$, being straight and the other part, $d$, being curved in hook form. The outer end of the straight part $c$ is formed with an eye, $e$, into which the strap C is secured.

The hitching-strap C is composed of two parts, $f f'$, one end of $f$ being attached to the bit-ring $a$, before alluded to, and the opposite end of said part $f$ being secured in the eye $e$ of the hook. The other part, $f'$, has one end secured to the outer end of a loop, $g$, on the bar or shank of the snap-hook, the opposite end of part $f'$ being attached to the rein or line B.

The loop $g$ at its inner end is attached to a spring, E, connected with the bar or shank, which spring has a tendency to keep said end in contact with the hook part $d$ of the bar or shank, near the end of $d$, and a spiral spring, $h$, is fitted on the bar or shank, and is connected to the loop $g$, said spring assisting the spring E in keeping the loop $g$ in contact with the hook part $d$. The bar or shank of the snap-hook forms the snap to retain the ring F of the post in the hook, (see Fig. 2,) and a person, after getting out of a vehicle or dismounting from a horse, draws the rein or line B, to which the hitching-strap C is secured, so that it will be slack or loose, and then shoves the hook $d$ through the ring F, the horse being then hitched to the post, as shown in Fig. 2.

In getting into a vehicle the driver simply pulls the rein or line B, to which the hitching-strap C is attached, and thereby draws the part $f'$ of the hitching-strap, and actuates the loop $g$ so as to release the hook from the ring, as shown in Fig. 3.

This device may be constructed at a very moderate cost, and is a decided improvement over the ordinary snap-hook now used with hitching-straps.

Having thus described my invention, I claim as new and desire to secure by Letters Patent—

A snap-hook attached to a hitching-strap, and constructed and applied substantially as shown and described, to admit of the detachment of the hook from the ring by the simple pulling of the rein or line to which the hitching-strap is connected, as set forth.

B. B. LEWIS.

Witnesses:
C. L. TOPLIFF,
JAS. A. SERVICE.